Nov. 27, 1928.

A. A. GOLDSTEIN 1,693,077

COUPLING DEVICE

Filed June 24, 1927

Inventor.
Aaron A. Goldstein.

Patented Nov. 27, 1928.

1,693,077

UNITED STATES PATENT OFFICE.

AARON A. GOLDSTEIN, OF BUFFALO, NEW YORK.

COUPLING DEVICE.

Application filed June 24, 1927. Serial No. 201,138.

The principal objects of the invention are to provide a simple form of coupling device particularly adapted for use in coupling the ends of cords and chains in such a manner that they will be locked securely together.

A further and important object is to provide a coupling which will swivel freely and which may be very easily coupled or detached.

The principal feature of the invention consists in the novel adaptation of a locking snap fastener as a coupling device in providing each of the coupling elements with connecting loops to receive the ends of a cord or chain.

In the drawings, Figure 1 is an elevational view showing my coupler attached to a key ring.

Figure 1:
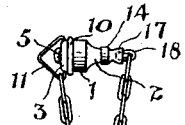
Figure 1:
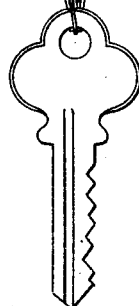
Figure 2:
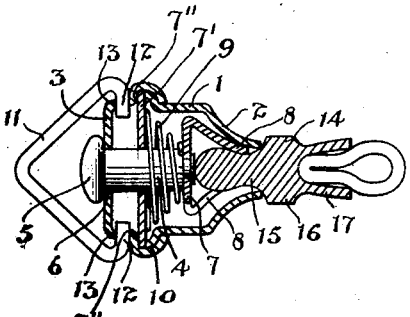
Figure 2 is an enlarged longitudinal sectional detail of the coupler.
Figure 3:
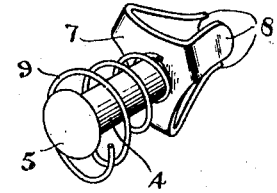
Figure 3 is a perspective detail of the plunger lock of the coupler.
Figure 4:
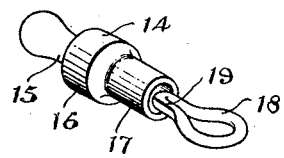
Figure 4 is a perspective detail of the swivel connector end.

This invention utilizes a well known type of socket fastener in which a headed stud is locked within a convergent throat by the insertion of a locking member between the throat and the neck of the stud.

In the application of the device herein shown a cylindrical casing 1 is formed with a convergent throat 2 and having the opposite end closed by the head 3 which is preferably made separately and secured in the open end of the casing by swedging or in any other suitable manner.

A stud 4 which is formed at its outer end with a head 5 is slidably arranged in a central orifice 6 in the head 3 and has secured at its inner end a plate 7 formed with a plurality of convergent spring fingers 8, said finger plate forming a clutch adapted to extend into the convergent throat 2 of the casing.

A coil compression spring 9 encircles the stud 4 between the plate 7 and the plate 7' which rests on the annular shoulder 7" of the head 3 and holds the clutch fingers into the throat.

The casing 1 is preferably reinforced by a circumferential rib 10.

A link 11, preferably of V-shaped formation having inwardly turned hooked ends 12 is secured in the casing 1, the hook ends being inserted through the holes 13 arranged in the head 3 of the casing beyond the shoulder 7". The link 11 provides a means for fastening the socket member with its locking device on the end of a cord or chain.

The head of the stud member 14 is adapted to enter the narrow end of the throat in the casing 1 and it enlarges from the neck portion 15 to the cylindrical part 16 and a hollow socket end 17 extends outwardly from the part 16.

A link member 18 which is formed with a narrow toothed end portion 19 is inserted into the socket 17 and the walls of said socket portion are pressed inwardly to grip said link, so that the link forms a solid part with the stud and provides the means for connecting the stud to the end of the chain or cord which is to be coupled to the chain or cord connected with the socket member.

The method of connecting the link 18 is very simple and positive and requires no heating or soldering.

The device is extremely simple. It is very neat in appearance and provides a very positive form of connection for the purposes described, as the stud 4 is locked securely in the casing upon its insertion and while it may swivel freely it cannot be removed without first withdrawing the locking clutch by lifting the head of the stud 4.

What I claim as my invention is:—

1. A coupling device, comprising a casing having a convergent throat at one end, a link member pivotally connected to the other end of said casing, a locking clutch arranged within said casing, a stud having a head end adapted to enter the throat and engage said locking clutch and having a socket end, and a loop link rigidly secured in the socket end of said stud.

2. A coupling device, comprising a cylindrical casing having a closed head and a convergent open end, a loop link having its ends pivotally secured to the head end of said cylinder at each side thereof, a spring actuated locking clutch arranged within said casing and a stud member having a head adapted to enter said throat and engage said clutch and having a looped outer end, and means extending centrally through said closed head for releasing said clutch.

3. A coupling device, comprising a cylindrical casing having an open convergent end, a locking clutch arranged within said casing, a link secured to said casing, a cylindrical member having a stud end adapted to enter said casing and having a socket end, and a chain link having a narrowed end inserted in the socket end of said stud, said socket end being flattened on to said link.

4. A coupling device comprising, a casing having a convergent open throat at one end, a head member closing the opposite end of said casing formed with an annular shoulder on the inside, a plate resting on said shoulder, a clutch member within said casing cooperating with said open throated end and having an operating stud extending centrally through said plate and head member, a compression spring encircling said stud within the casing and extending between the clutch member and and the plate, a connection member secured to said head member, a stud member adapted to be inserted in said open throat and be engaged by said clutch member, and a loop connection on said latter stud.

AARON A. GOLDSTEIN.